March 9, 1954
L. N. BRUBAKER
2,671,388
METHOD AND APPARATUS FOR DETERMINING TIP
AND TILT IN AERIAL SURVEY PHOTOGRAPHY
Filed July 27, 1948
5 Sheets-Sheet 2
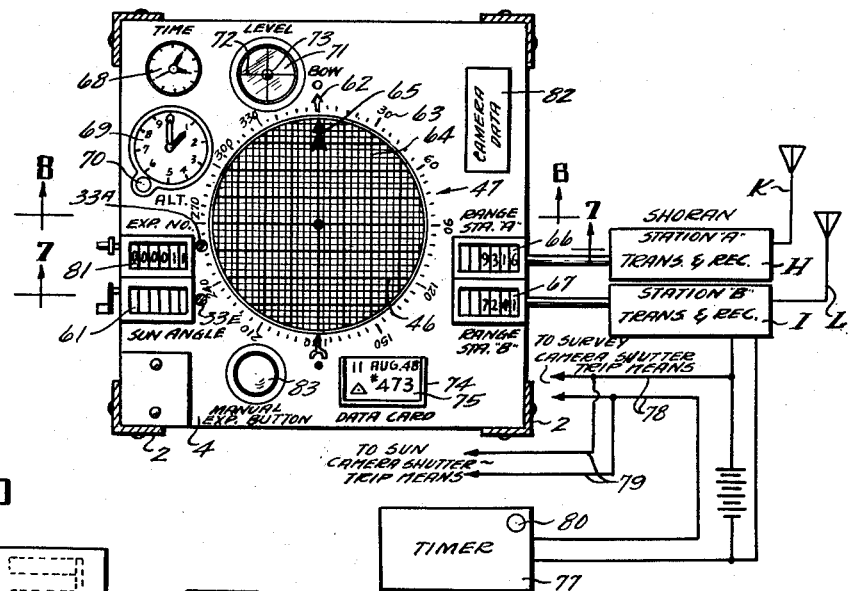
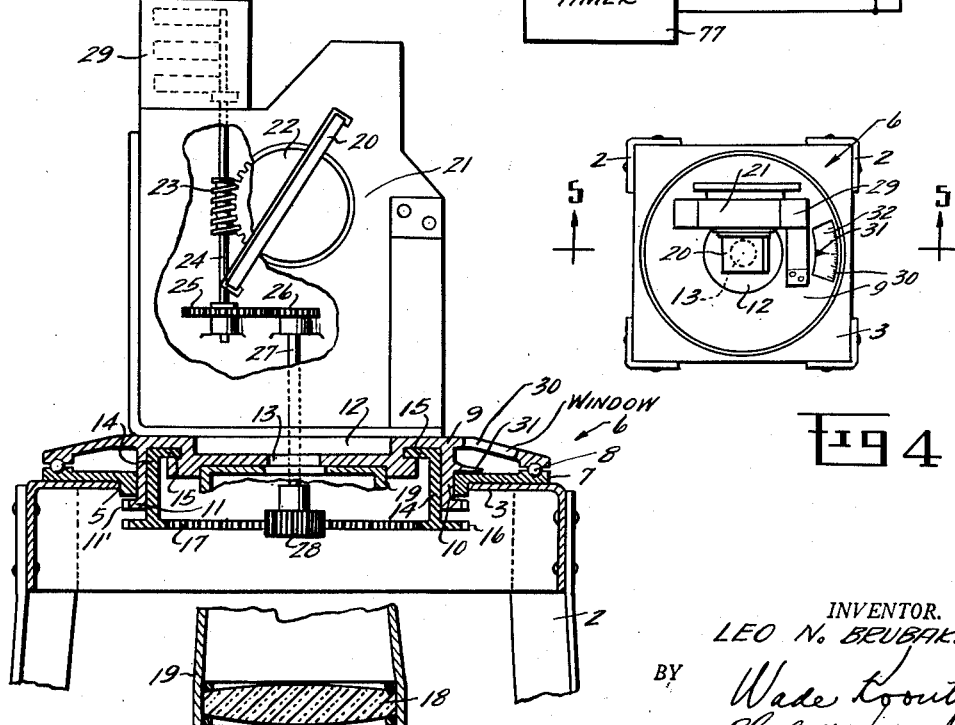
INVENTOR.
LEO N. BRUBAKER

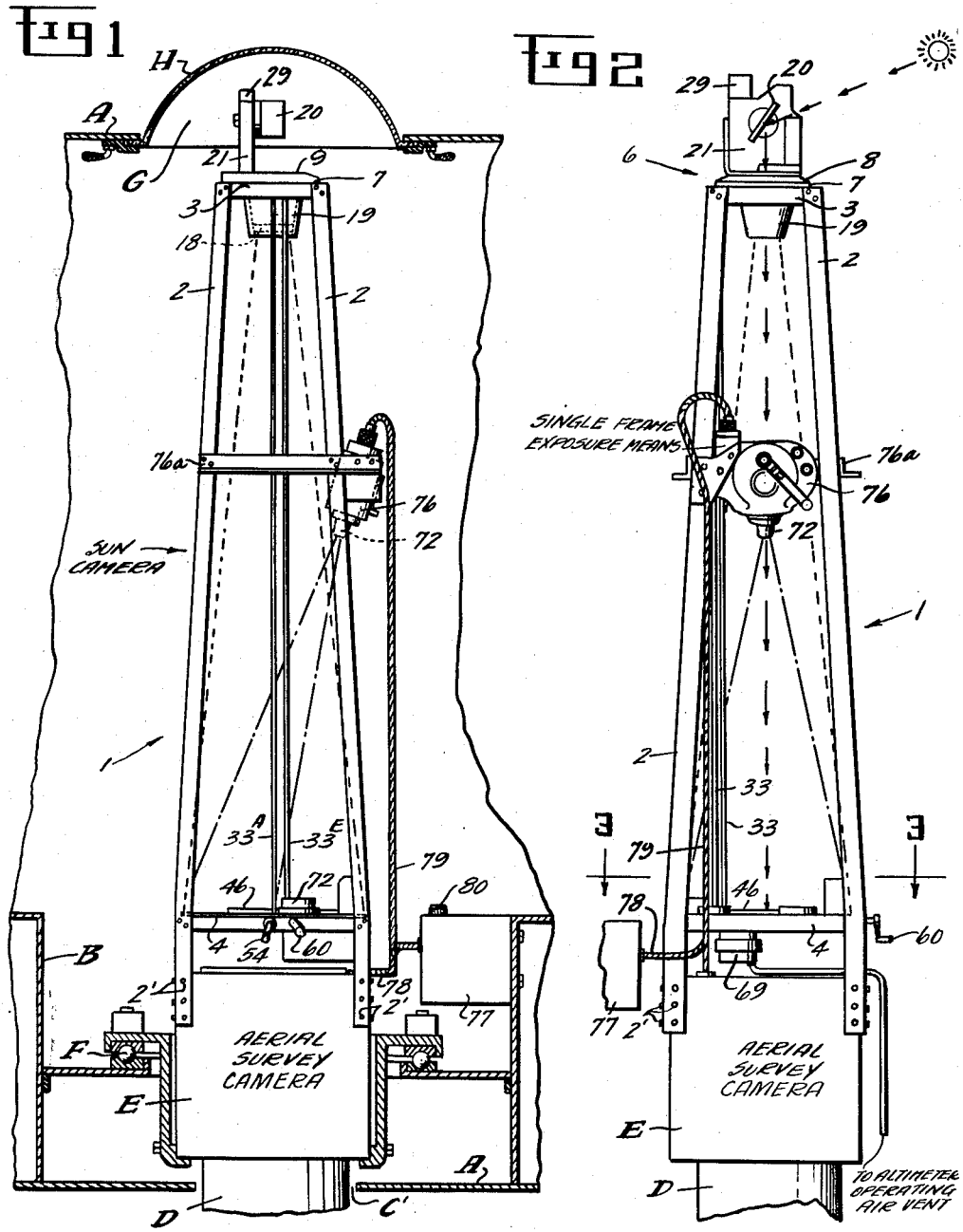

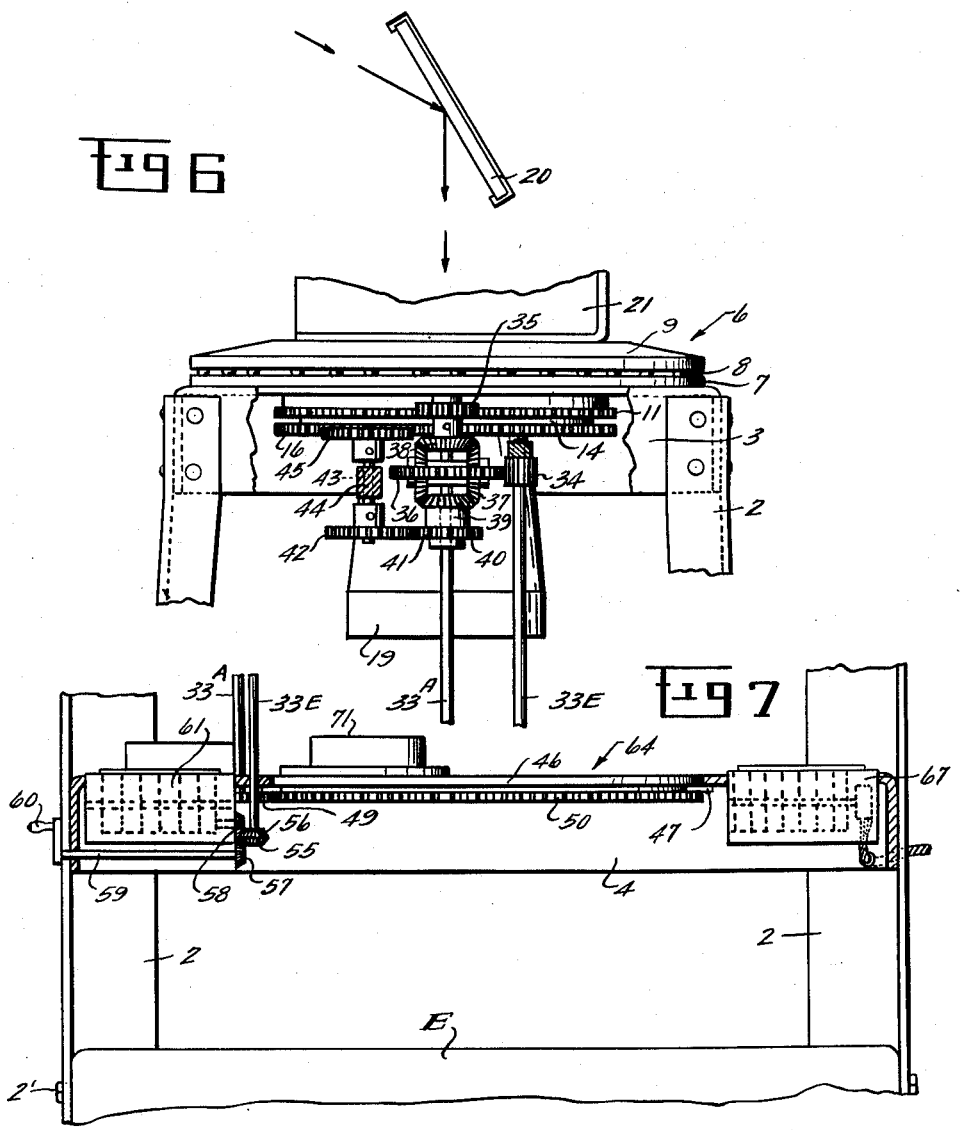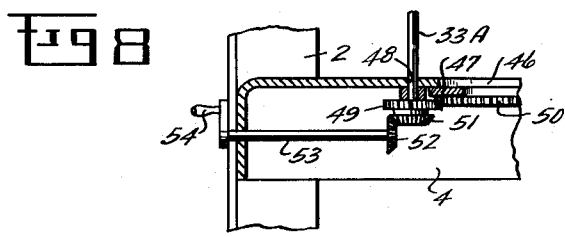

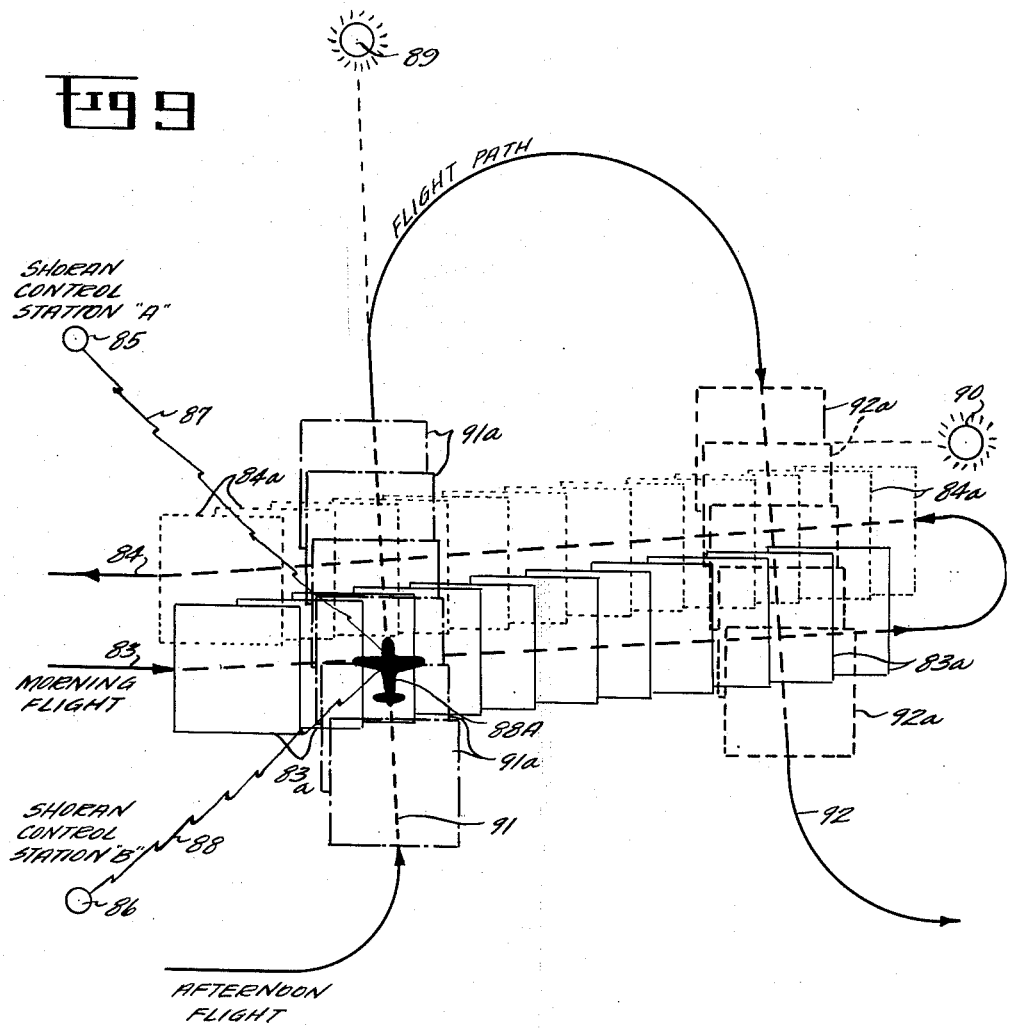

March 9, 1954

L. N. BRUBAKER 2,671,388

METHOD AND APPARATUS FOR DETERMINING TIP
AND TILT IN AERIAL SURVEY PHOTOGRAPHY

Filed July 27, 1948

INVENTOR.
LEO N. BRUBAKER
BY
ATTORNEY

Patented Mar. 9, 1954

2,671,388

UNITED STATES PATENT OFFICE 2,671,388

METHOD AND APPARATUS FOR DETERMINING TIP AND TILT IN AERIAL SURVEY PHOTOGRAPHY

Leo N. Brubaker, Dayton, Ohio

Application July 27, 1948, Serial No. 40,973

13 Claims. (Cl. 95—12.5)

(Granted under Title 35, U. S. Code (1952), sec. 266)

The invention described herein may be manufactured and used by or for the Government for governmental purposes without payment to me of any royalty thereon.

This invention relates to aerial survey photography, and more particularly to methods and apparatus for determining the degree of tilt in aerial survey photographs in transverse intersecting planes and eliminating the tilt effect to thereby determine the "nadir" point in the photographed area, or the point in the terrain in the photograph precisely below the camera at the time that the photograph was made.

In aerial photographic surveys, in order to determine the nadir point and geographical positions of objects in the photograph directly from the photograph, the geographical position of the survey aircraft and its altitude must be known or determinable. If the photographic axis of the survey camera is precisely vertical and its focal plane horizontal or perpendicular to the vertical photographic axis, the nadir point can be determined directly from the photograph and since the geographical position of the aircraft would coincide with the nadir point at the center of the photograph the geographical positions of any selected objects disclosed in the photographs can be easily and directly determined.

The geographical position of the survey aircraft above the terrain at the time the terrain is photographed can be accurately ascertained by several conventional methods such as the well known Loran and Shoran systems. In both of these methods radiant energy signals are employed between the survey or mapping aircraft while in flight and two well separated sending or "control" stations, each having a definite geographical location. The rate and time of transit of radio, or radar waves or signals between the two stations and the aircraft is accurately and automatically calculated in terms of distance, instantly giving the geographical location of the survey aircraft relative to the two stations within very close geographical limits.

The orientation of the photographs and ground track of the survey aircraft can also be determined with accuracy by well known methods such as by magnetic compass headings, corrected for lateral drift. Altitude is also determined conventionally, for instance, by a sensitive altimeter device.

Many efforts have been made to provide a stabilized platform or support on a survey aircraft for a mapping or survey camera so as to maintain the platform horizontal at all times with the camera axis vertical, such as by utilizing gyroscope controls and gravity operated leveling devices. When such leveling devices are employed, especially while photographing the terrain below a survey aircraft while traveling at high speeds, the precise leveling of the camera support is often impossible due to acceleration forces and many other causes, and the desired degree of leveling is not attained. These gravity operated leveling devices and conventional methods for maintaining the camera focal plane horizontal in aircrafts while in flight are therefore somewhat uncertain and of questionable value for accurate aerial photographic surveys, particularly for military purposes. In nearly every instance, when aerial survey photographs are made with the photographic axis of the camera in an assumed vertical position and the focal plane assumed to be horizontal the camera focal plane is not precisely horizontal but is inherently tilted or inclined in transverse intersecting planes and one of these tilt planes will hereafter be referred to as the "X" plane of tilt in the photograph, while the other tilt plane will be referred to as the plane of "tip," or the "Y" plane of tilt, in other words referred to as the "X" and "Y" planes (or tilt and tip) of the camera focal plane at the time and the position when and where the aerial survey pictures were taken.

An object of the present invention is therefore the provision of novel means for accurately determining the degree of "X" and "Y" tilt of the focal plane of an aerial survey camera relative to the true horizontal plane at the time aerial survey photographs are made from an aircraft in flight at geographically known positions, by simultaneously photographing a selected celestial body and utilizing the known position of the selected celestial body in the heavens as a reference position, relative to a horizontal position of the survey camera focal plane to determine the degree and direction of tilt of the survey camera focal plane and therefore to determine the tilt in the photographs.

A further object is the method of determining transverse tilt in aerial survey photographs made with a camera having an assumed vertical photographic axis and horizontal focal plane, which comprises flying over the terrain to be photographed, at two different time periods when the position of a selected celestial body, such as the sun, has changed approximately 90° in azimuth, simultaneously photographing the celestial body and the terrain below, at each of said time periods and at the same approximate geographical position, with an aerial survey camera having an assumed vertical photographic axis and a horizontal focal plane, and with a sun camera having its photographic axis adjusted in azimuth relative to the sun direction and adjusted in elevation to the position of the celestial body relative to the assumed horizontal position of the survey camera focal plane, whereby the angular difference between the sun camera photographic axis and a line from the position of the selected celestial body to the geographical position of the survey camera, as indicated by the photographed position of the image of the celestial body when in one of its photographed positions records the degree of tilt of the survey camera focal plane and the tilt in the aerial survey photograph in one of the "X" and "Y" planes of tilt, and the angular distance between the axis of the sun camera and a line from the said second substantially same geographical position of the survey camera and sun camera to the selected celestial body, when the position of the celestial body has changed approximately 90° in azimuth, denote the degree of tilt of the survey camera focal plane in the other of the "X" and "Y" tilt planes, and therefore denotes the degree of tilt in the other aerial survey photograph, taken at the substantially said geographical position, in the other or transverse tilt plane.

A further object is the provision of an improved aerial survey camera level determining means which comprises the provision of an aerial survey camera and a sun camera adjustably fixed thereto with means for reflecting the image of the sun to a predetermined position in the focal plane of the sun camera from a reference position when the focal plane of the aerial survey camera is level, and means in the sun camera for determining the degree of tilt of the focal plane of the aerial survey camera in a vertical plane extending toward the sun, between a horizontal position of the survey camera focal plane and the position of the focal plane at the time when the image of the sun is recorded on the sun camera photograph.

A further object of this invention is the provision of means for reflecting the image of the sun to a predetermined position in the focal plane of the sun camera from a reference position when the focal plane of the aerial survey camera is level, and means in the sun camera for determining the degree of tilt of the focal plane of the aerial survey camera in a vertical plane extending toward the sun, between a horizontal level position of the survey camera focal plane, and the position of the actual focal plane at the time when the image of the sun is recorded on the sun camera photograph.

A further object of this invention is the provision of means for photographing the terrain below an aircraft while on an aerial photographic survey on a known course at a known geographical position and altitude and at a definite time, and simultaneously photographing a selected celestial body, such as the sun, with a sun camera having a photographic axis adjusted to extend directly toward the position of the selected celestial body relative to an assumed vertical position of the survey camera photographic axis when the selected celestial body is located in one portion of the heavens, to determine the tilt of the aerial survey camera focal plane in one plane by measuring the angular difference between the assumed and photographed positions of the celestial body in the sun camera when the terrain directly below is simultaneously photographed with the aerial survey camera.

A further object of my invention is a method of determining the "X" and "Y" tilt in aerial survey photographs which comprises photographing the terrain directly below a survey aircraft with an aerial survey camera having a substantially horizontal focal plane, and simultaneously photographing a selected celestial body with a sun camera having its photographic axis adjusted in azimuth and in elevation relative to the focal plane of the survey camera so that when the survey camera focal plane is precisely horizontal at the geographical location of the survey camera the sun camera axis will extend directly toward the position of a selected celestial body such as the sun, measuring the displacement of the photographic image of the celestial body in the sun camera photograph from a predetermined reference position therein where the survey camera focal plane would be horizontal to determine the degree of tilt of the survey camera focal plane toward the selected celestial body, determining the transverse tilt of the survey camera focal plane by simultaneously photographing the same terrain below, and the same celestial body at a different predetermined time when the position of the body in the heavens has changed approximately 90°, with the sun camera axis adjusted in azimuth and in elevation relative to a horizontal position of the survey camera focal plane and the orientation of the survey camera focal plane to extend directly toward the selected body if the survey camera focal plane is level, measuring the displacement between the calculated or reference position of the image of the selected celestial body in the sun camera focal plane when the survey camera focal plane is assumed to be level, and the photographed position of the image of the selected celestial body in the sun camera focal plane as recorded in the sun camera to determine the degree of tilt of the survey camera focal plane when the terrain and selected celestial body are simultaneously photographed at the said different definite time, matching and orienting the two terrain photographs thus obtained to determine the relative degree of tilt existing therebetween when they were made, tilting the survey photographs in the X and Y tilt planes to agree with the respective degrees of displacment of the selected celestial body images in the simultaneously made sun camera photograph from the reference position of the sun image thereon, to dispose the terrain photographs in parallel relation to their original tilt planes at the time when they were made.

Other objects and advantages will become apparent from the following description, taken in connection with the accompanying drawings in which like reference characters refer to like parts in the several figures.

Fig. 1 is a side elevation of a preferred form of my combined aerial survey camera and sun camera apparatus, showing the same installed in an aerial survey aircraft, the aircraft being shown somewhat diagrammatically, and parts being broken away and shown in section.

Fig. 2 is a front elevation of the apparatus shown in Fig. 1 with the supporting aircraft structure omitted.

Fig. 3 is a horizontal sectional view taken approximately on the plane indicated by line 3—3 in Fig. 2 looking in the direction of the arrows, certain operating features being shown diagrammatically.

Fig. 4 is a plan view of the upper or head structure of my invention.

Fig. 5 is an enlarged fragmentary vertical sectional view, taken approximately on the plane indicated by line 5—5 in Fig. 4, parts being broken away to show the adjustment features for the sun image reflecting means.

Fig. 6 is an enlarged fragmentary side elevation of the head portion of my apparatus as seen from the side opposite to that shown in Fig. 5, parts being broken away and shown in section.

Fig. 7 is a fragmentary vertical sectional view taken through the lower platform of my supporting structure approximately in the plane indicated by 7—7 of Fig. 3.

Fig. 8 is a fragmentary sectional view taken approximately on the plane indicated by the line 8—8 in Fig. 3.

Fig. 9 is a somewhat diagrammatic plan view illustrating a typical course or ground track that is flown, in making successive overlapping photographs of a selected terrain below, when the sun is in one position azimuth, and depicting a second course or ground track for making overlapping photographs of a geographical control area when the sun's position in azimuth has changed approximately 90°.

Figure 10:
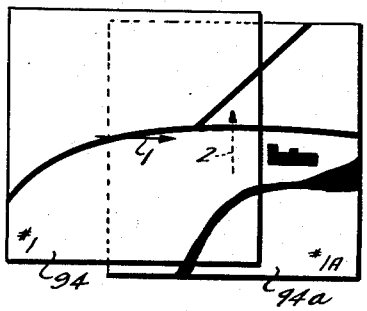
Fig. 10 represents a composite diagrammatic view of two superimposed views or photographs of a selected terrain taken at two different times when the sun's position in azimuth has changed approximately 90°.
Figure 10A:
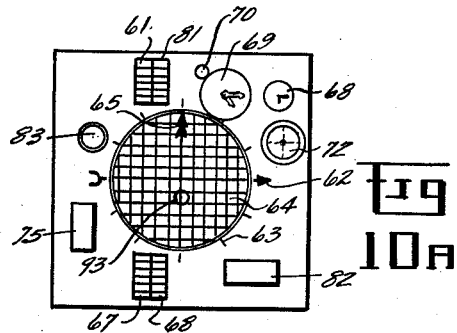
Figure 10B:
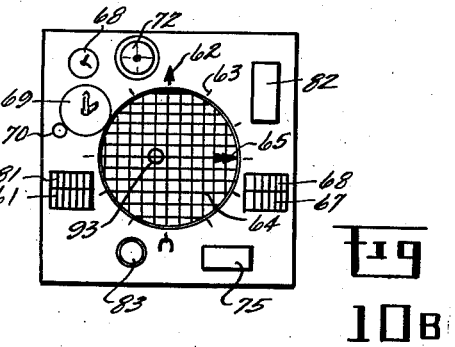

Figs. 10A and 10B respectively represent photographs taken with the sun camera simultaneously with the terrain representative in the two outline views in Fig. 10, and showing the degree of displacement or tilt in the survey camera focal plane in a plane toward the sun, indicated by the degree of displacement of the center of the sun's image from the center of the grid plate of the sun camera.

Figure 11:
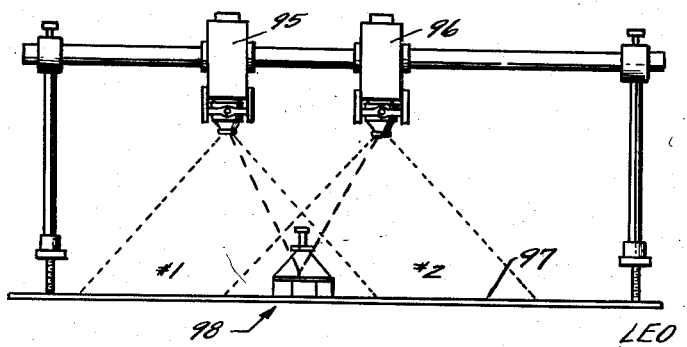

Fig. 11 is a side elevation somewhat diagrammatically illustrating the arrangement of a "Multiplex" mapping apparatus used to match terrain photographs to steroscopically determine the angular relation between the planes of two terrain photographs, such as represented diagrammatically in Fig. 10A.

Figure 12:
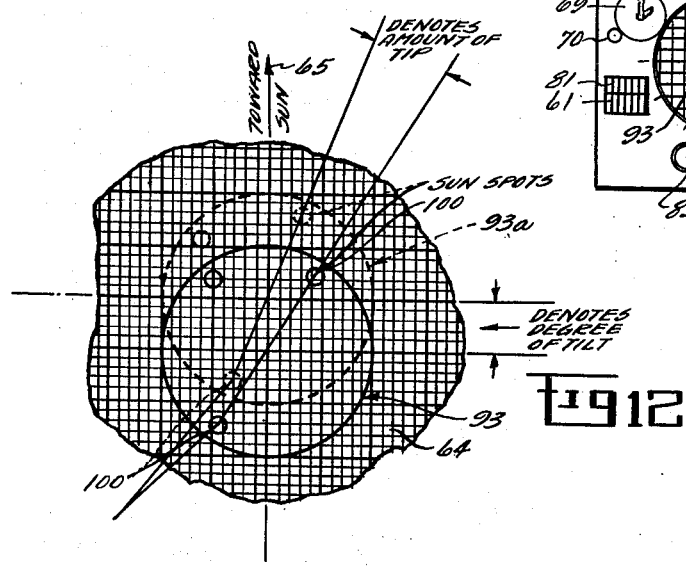

Fig. 12 is an enlarged fragmentary view representing a portion of a photograph of the grid portion of the grid plate surface, showing an assumed position of the sun image and its sun spots thereon in dotted lines, when the survey camera focal plane is assumed to be level, and illustrating in full lines the angular displacement of the sun image and rotative displacement of the sun spots thereon, when the focal plane of the survey camera is tilted and tipped during the simultaneous photographing of the terrain and the sun.

Referring more particularly to Fig. 1 the reference numeral A denotes the fuselage or body portion of an aerial survey aircraft or aerial mapping airplane having a camera well B with a lower opening C for receiving the lens tube D of an aerial survey camera E, the camera being mounted on suitable camera mounting means as indicated at F. The camera and mounting means are preferably conventional and may be either conventional anti-vibration azimuth adjustable mounting means and cushions, or a gyro stabilized mount if desired so that the camera focal plane will remain substantially rigid and horizontal while the aerial survey aircraft is in normal horizontal flight. Directly above the camera well B is an enlarged preferably circular opening G, reasons for which will become apparent as the description proceeds. The opening G is provided with a transparent astrodome H, preferably arranged to be easily removed or mechanically swing out of the way while my apparatus is being used.

Rigidly mounted on the camera is an elongated rectangular frame or support 1 which constitutes the supporting frame of my improved apparatus, the frame being fabricated and comprising four angle bars 2—2—2—2, secured to the survey camera by suitable fastening means such as the screws 2'. The longitudinal axis of the angle frame 1 is precisely perpendicular to the focal plane of the aerial survey camera E, and extends concentrically through the opening G, the top of the frame terminating immediately below the circular opening. The frame 1 is preferably formed of "dural" or other rigid light material and carries an upper supporting plate or platform 3 located just below the "astrodome" H, a lower supporting plate or platform 4 being provided immediately above the top surface of the survey camera E, the upper surfaces of the platforms 3 and 4 being perpendicular to the longitudinal axis of the frame 1 and parallel to the focal plane of the camera E.

Referring now to Fig. 5, the upper platform 3 is formed with a central opening 5, receiving a turntable structure 6, comprising a circular supporting plate 7 having a ball race 8. An upper turntable or reflector support 9 having a tubular extension 10 extends through the opening 5 and rotates on the ball race 8, terminating in an annular flange 11 having a ring gear 11' extending around its periphery. The turntable support 9 is retained on the circular support 7 by the ring gear flange 11 and is concentrically rotatable about the axis of the frame 1 on the balls of the race 8, the turntable 9 having a centrally depressed portion 12 formed with an enlarged axial opening 13 and a concentric tubular sleeve extension 14 rotatable within the tubular extension 10 and retained therein by the annular flange 15, the sleeve 14 having internal and external ring gears 16 and 17 for purposes later to be set forth.

Concentrically mounted, directly below the enlarged opening or aperture 13 is a sun camera lens or objective 18, the sun camera lens 18 having a focal plane located at the top surface of the lower platform 4. The photographic axis of the lens 18 is preferably concentric to the longitudinal axis of the frame 1, the lens 18 being supported by bracket members 19 extending from the central portion of the turntable 9 as shown in the drawings or secured directly to the upper platform 3.

Adjustable reflecting means is provided, preferably in the form of a mirror 20 having its outer surface silvered, as shown in Figs. 1, 2, 4, 5 and 6, although a reflecting prism may be substituted for the mirror 20. The adjustable reflecting means or mirror 20 is mounted in a plane extending across the longitudinal axis of the frame 1 and sun camera lens axis, and is tiltably journaled on a supporting plate or housing 21 for tilting movement about an axis perpendicular to the lens axis and in a plane radial to the lens axis and parallel to the sun camera focal plane. Adjustment of the mirror or reflector 20 is accomplished by a worm gear segment 22 fixed on the reflector mounting shaft, the gear segment meshing with a worm gear 23 fixed on a shaft 24 having a gear 25 fixed thereon in mesh with a gear 26 fixed on a shaft 27 suitably journaled in the casing 21, the shaft 27 having a gear 28 fixed on the end thereof, meshing with the internal ring gear 17 on the tubular sleeve 14. Rotative adjustment of the tubular sleeve 14 relative to the turntable 9 adjusts the reflecting angle of the reflecting surface of the reflector 20.

The shaft 24 extends upwardly into an angle indicating counterdevice 29 and is suitably and conventionally connected to the angle indicating countermechanism to indicate twice the complement of the angle formed between a plane perpendicular to the adjusted plane of the reflecting surface of the reflector 20 and the focal plane of the camera less 90° or the angle between the focal plane of the aerial survey camera and a line extending toward the position of the sun when the sun image is reflected by the reflector 20 in a direction parallel to the longitudinal axis of the sun camera and perpendicular to the survey camera focal plane and the survey camera focal plane is level. The turntable 9 is provided with a window 30 as shown in Figure 4, and a pointer 31 is visible therethrough, disposed for registration with an azimuth angle indicating scale 32 fixed on the turntable platform 7, indicating the azimuth angle of the tilt plane of the sun image reflecting mirror (or prism) 20 relative to the orientation of the survey aircraft mapping camera E.

The turntable 9 and the reflector head are rotated together in azimuth as a unit by a vertical shaft 33A, Fig. 6, suitably journaled in the frame 1, the shaft 33A having a gear 35 fixed on the end thereof in mesh with the annular gear element 11'. Rotation of the shaft 33A therefor adjusts the turntable 9 and the radial position of the tilt plane of the mirror 20 in azimuth, while rotation of the gear 16 adjusts the tilt angle or degree of tilt of the mirror 20 in elevation. The gear 16 is capable of independent adjustments in order that the reflector 20 may be adjustable, either in azimuth or in elevation, or both, and a differential gear arrangement is provided for this purpose. The shaft 33E is suitably journaled in the frame 1 for adjusting the angle of the reflector 20 in elevation.

The shaft 33E has a gear 34 fixed thereon at its upper end, meshing with a spider gear 36 carrying two spider bevel gears 37, each bevel gear meshing in turn at their top portions with a bevel gear 38 fixed on the azimuth adjustment shaft 33A for rotation with a gear 35. A lower bevel gear 39 is freely journaled on the azimuth adjustment shaft 33A and meshes with the lower sides of the two spider gears 37. This loose or idler bevel pinion 39 has a sleeve-like extension 40 on which a pinion 41 is fixed, having the same pitch circle as the pinion 35. The two gears 39 and 41 and connecting extension 40 constitute a twin gear unit, free on the shaft 33A. The gear 41 meshes with a gear 42 fixed on a vertical "jack" shaft 43, journaled in a bracket 44 that is fixed on the frame 1. The jack shaft 43 has a second gear 45 fixed thereon having the same pitch diameter as the gear 42, this second gear meshing with the gear 16 extending around the periphery of the tubular sleeve member 14.

Referring to Fig. 6 it will be observed that when the azimuth adjustment shaft 33A rotated to rotate the gears 35 and 38, the turntable 9 is adjusted in azimuth. The elevation adjustment shaft 33E may remain stationary, holding the spider gear 36 stationary by the meshing engagement of the gear 34 on the elevation adjustment shaft 33E since the gear 34 is held stationary. Rotative adjustment of the other or elevation adjusting shaft 33E will adjust the tilt angle of the reflector 20. When the spider gear 36 is held stationary the two bevel gears 37—37 are forced to rotate on their axes, rotating the bevel pinion 39 and its connected gear 41. The gear 41 meshes with the lower gear 42 of the identical size gears 42—45 while the other gear 45 (Fig. 6) meshes directly with the internal ring gear 17 on the tubular extension member 14. If the head 9 is rotated by the azimuth adjustment gear 35, motion is transmitted through the differential gear mechanism 38—37 and 39 to the gear 42, and through the jack shaft 43 and pinion 45, to rotate the sleeve extension 14 at the same rate, and in the same direction, as the rotative movement and direction of the gear 11. Thus rotative or azimuth adjustments of the head by the azimuth adjustment shaft 33A does not produce any tilt adjustments of the mirror 20. When the elevation adjustment shaft 33E is rotated, the gear 34 rotates the spider gear 36 which is loose on the shaft 33A. Since the azimuth adjustment shaft 33A is now stationary the pinion 38 will be held stationary causing the spider bevel gears 37 to planetate around the gear 38, rotating the bevel pinion 39 and its connected pinion 41, and through the gears 41, 42 and 45 and the external ring gear 16, the tubular sleeve extension 14 is rotatably adjusted relative to the sleeve 10 of the turntable 9. The internal ring gear 17 on the sleeve 14 (Fig. 5) rotates the pinion 28, rotating the vertical shaft 27 in the gear box housing 21, rotating the gears 26, 25, shaft 24 and worm gears 22 and 23 to cause the reflector device 20 to be adjustably tilted with the turntable 9 stationary. From the above it will be observed that the reflector device 20 may be independently adjusted in azimuth, or in elevation, at any time by relative independent rotative adjustments of the azimuth and elevation adjustment shafts 33A and 33E. The top surface or plane of the lower platform or supporting table 4 is located at the focal plane of the sun camera lens 18 and carries turntable 46 which is rotatably adjusted in unison with the upper turntable or reflector support 9, so that azimuth adjustments of the lower turntable 46 and the upper turntable 9 are always simultaneous and identical. Referring to Fig. 8, the lower turntable or grid support or plate 46 is journaled for rotation in an opening or recess 47 formed in the upper surface of the lower platform 4, so that the axis of rotation of the grid plate 46 is coincident with the longitudinal axis of the frame 1 and preferably coincident to the photographic axis of the lens element 18.

The azimuth adjustment shaft 33A extends through a suitable opening 48 in the platform 4 adjacent the periphery of the rotary grid plate 46, a gear 49 being fixed on the azimuth shaft 33A meshing with a ring gear 50 secured to the grid plate below the surface of the platform 4. The gear ratio between the gear 49 and the ring gear 50 on the grid plate 46, relative to the ratio between the gear 35 on the upper end of azimuth shaft 33A and the ring gear 11 on the upper turntable 9 is such that movements of the upper turntable 9 and the lower turntable or grid plate 46 in azimuth are always simultaneous and identical. The lower end of the azimuth shaft 33A has a bevel gear 51 fixed thereon, meshing with a bevel gear 52 fixed on a horizontal shaft 53 which extends through the side of the platform 4 below the upper surface thereof, and an operating handle or crank 54 is fixed on the end of the shaft 53 for convenient actuation by an operator to simultaneously adjust the azimuth position of the tilt plane of the reflector 20 and azimuth position of the grid plate 46.

The lower end of the elevation adjustment shaft 33E extends (in Fig. 7) through the lower platform 4, adjacent the grid plate 46, and preferably has secured onto the lower end thereof a pair of bevel gears 55 and 56 meshing respectively with bevel gears 57 and 58. The bevel gear 57 is fixed on the end of a horizontal operating shaft 59 which extends through the side flange of the platform 4 with an actuating or setting handle 60 is secured thereon for adjusting the tilt angle of the reflector 20. The bevel gear 58 is fixed on a shaft which extends into and operates a conventional degree angle counter 61 of the "Veeder" type, having a window opening upwardly for viewing the counter wheel indicia therein from above. The counter 61 is arranged to measure or indicate the tilt angle of the reflector 20 relative to the horizontal or focal plane surface of the platform 4, and therefore relative to the focal plane of the survey camera E, it being understood that the degree of adjustment of the reflecting surface of the reflector 20 is only one-half of the change in the angle of reflection of a selected celestial body such as the sun, when reflected by the reflector 20 through the lens system 18 and downwardly onto the surface of the grid plate 46. On the upper surface of the lower platform 4, as seen in Fig. 3, adjacent the periphery of the grid plate 46 is inscribed with an arrow or other indicia 62 denoting the direction or orientation of the survey camera E. Provision is also made for rotatably adjusting the survey camera in azimuth about the longitudinal axis of the elongated rectangular frame 1 to orient the survey camera relative to the ground track of the survey aircraft. The top surface surrounding the grid plate 46 is divided in degrees as indicated at 63, indicating the azimuth angle of the tilt plane of the reflector 20 from the mark or arrow 62, or relative to the orientation of the survey camera E.

The top surface of the grid plate 46 is inscribed or marked to provide a grid pattern 64 as best shown in Fig. 3, calibrated from the rotational axis or center of the grid plate in transverse directions to indicate predetermined degree angles between the longitudinal axis of the frame 1 and the direction or position of the center of the image reflected by the mirror 20 onto the calibrated grid surface 64. The transverse cross or intersecting lines of the grid pattern extend parallel and transverse to the tilt plane of the reflector 20 and the grid pattern is provided with an indicating mark or arrow 65 to indicate the angular position of the adjustable tilt plane of the reflecting surface 20 relative to a predetermined position of the aerial survey photographs. When the image of a celestial body such as the sun is reflected onto the surface 64 of the grid plate 46 and the survey camera focal plane is precisely level, and the reflector 20 has been adjusted in azimuth and in elevation for the exact position of the celestial body in the heavens, for the geographical position of observer at a time of the observation, the image of the celestial body will be reflected by the reflector 20, through the lens 18, at the exact center of the grid plate, denoting that the camera axis is precisely vertical and its focal plane is level and any transverse tilt of the survey camera axis or its focal plane will displace the reflected image of the sun from the center of the grid disc, the relation of the sun's image to the calibrated transverse lines on the grid surface 64 denoting the direction and the degree of the tilt, particularly in the vertical tilt plane extending toward the sun or celestial body.

Located on the lower platform or support 4, near the periphery of the grid disc 46 are a pair of geographical position locators or range distance indicators 66 and 67 for indicating the distance from two known or predetermined geographical locations. These indicators are of conventional construction such as the distance indicating parts or mileage indicators of a "Loran" or "Shoran" position determining equipment, the mileage indicator discs being electrically operated in the conventional manner in conjunction with the "Loran" or "Shoran" station transmitters and receivers H and I, which transmit signals or impulses of radiant energy through the antenna K and L to "trigger" the transmitters at the geographically known "Loran" or "Shoran" sending or control stations. The times of transit of the radiant energy impulses in terms of distance, such as miles or feet between the two separated stations and the survey aircraft are automatically indicated by the indicating counters 66 and 67. The "Loran" or "Shoran" transmitters and receivers H and I on the aircraft are indicated diagrammatically since they are well known commercial instruments and their constructional details are well known.

A time indicator or chronometer is also suitably mounted on the upper surface of the platform 4, indicating correct Sidereal of G. C. T., this clock or watch being indicated in the drawings at 68. A sensitive altimeter is also mounted on the platform 4 as indicated at 69 having a setting knob 70, for continuously indicating the relative altitude of the aircraft between exposure stations during the aerial photographic survey. Corrections may be later made to determine the true altitude of the aircraft, if necessary. A vibrator (not shown) is preferably incorporated to vibrate the altimeter 69 to increase its sensitivity if desired. The altimeter and associated vibrator are conventional aircraft instruments and further illustration thereof should not be necessary, other than to illustrate the dial, indicating pointers and the setting knob as disclosed in Fig. 3.

The platform 4 also carries a level indicator 71 having cross hairs 72 and the bubble 73, so that the approximate level position of the platform 4 (and, of course, the approximate vertical position of the photographic axis of the survey camera and horizontal position of its focal plane) will be indicated and recorded. The platform 4 also carries a data card holder 74 for receiving and holding a data card 75 having data thereon relating to the survey flight, such as the date, triangulation data, etc.

A camera 76 is provided, as depicted in Figs. 1 and 2, for making a photographic record of the top surface of the platform 4 and the recording instruments, etc., simultaneously with the photographs of the terrain below that are made by the aerial survey or mapping camera E. The camera 76 forms a part of the sun camera combination and is suitably supported on bracket members 76ª, positioned so that its photographic axis extends toward the center of the grid disc 46, its photographic field including the entire top of the platform 4 and all instruments and data thereon so that the instruments and data will be photographed with the grid disc 46 and the position of the image of the sun as focused thereon through the sun camera lens 18. Although the camera 76 forms an important photographic recording part of my sun camera apparatus, the camera 76 is preferably a standard or conventional item such, as a 16 mm. moving picture camera set to take a single frame or exposure simultaneously each time the shutter mechanism of the aerial survey camera E is tripped.

I have somewhat diametrically disclosed an electric shutter tripping mechanism and circuit for the shutters of the sun camera 76 and the aerial survey or mapping camera E. Referring to Fig. 1 and Fig. 3 a suitable "intervalometer" of any conventional or well known type is provided as diagrammatically indicated at 77 for producing uniformly tuned successive electrical impulses in the circuit conductors 78 and 79 leading respectively to the electrical shutter tripping mechanisms for the actuating of the shutters of the aerial survey camera E and the "single frame" recording movie camera 76. Each time the intervalometer 77 sends out an electrical impulse through conductors 78 and 79, the survey camera exposes a picture of the terrain below and the camera 76 simultaneously makes a photographic exposure of the grid plate 46 and its associated instruments. A setting knob 80 is adjustable to regulate the time interval between the photographic exposures in order to obtain the proper or usual 60 per cent overlapping relation in the aerial survey photographs. An exposure counter may be provided as indicated at 81, preferably of the "Veeder" type, connected to a conventional magnetic actuator in the shutter tripping circuit 79 so that the exposures that are made with the camera 76 and camera E may be counted and recorded for later identification. A rectangular opening 82 is provided in the platform 4 so that data and indicia on the top of the aerial survey camera relating to the aerial survey camera may be photographed by the sun camera element 76 with the data, instruments and indicators carried by the platform 4. A manually operable exposure button 83 is also provided on the top of the platform 4 having electrical connections (not shown) for closing the circuits 78 and 79, to actuate the sun and survey camera shutters simultaneously at any time.

In usual aerial mapping practice the survey aircraft is flown back and forth along parallel ground tracks or courses as shown in Fig. 9 at 83 and 84 so that the photographs taken from the aircraft by the survey camera E overlap in both directions, the intervalometer 77 being adjusted to regulate the exposure intervals, so that the photographic area in each photograph overlaps the succeeding photograph in the "ground track" by approximately 60 per cent. The aerial survey camera is also oriented in its mount so that all of the survey photographs are oriented in the same direction. The photographed areas along the flight paths 83 and 84 are indicated as 83a and 84a. The reference numbers 85 and 86 diagrammatically indicate two spaced "Shoran" control stations while 87 and 88 indicate distances between the control stations 85 and 86 and the aircraft as measured by the "Shoran" equipment and 88A denotes the precise position of the survey aircraft from each of the control stations when one of the photographic exposures is made.

If a flight is made in the morning, for instance, with the sun at right angles to the ground track 83—84 as indicated at 89, and the position of the reflector 20 is adjusted in azimuth and in elevation by the handles 54 and 60 so that the image of the sun will be reflected vertically downward through the lens 18 for the time of the exposure and "Shoran" position of the survey aircraft as indicated by the indicators 69, 66 and 67 any tilt, particularly transverse to the ground track flight direction, will displace the reflected image of the sun on the grid plate 46 from the center and this position of the image relative to the grid lines on the grid pattern or surface 64 will denote a predetermined degree of tilt in the focal plane of survey camera E particularly in the plane toward the sun.

As the exposures of the terrain are made, the grid plate surface, sun image and associated instruments are simultaneously photographed to record the degree of tilt in the focal plane of the survey camera E relative to a calculated position of the sun in the heavens for the geographical position of the aircraft for the time indicated where the reflected sun image would be at the center of the grid plate if the survey camera focal plane was level.

In the afternoon when the sun's position has changed approximately 90 degrees in azimuth, as indicated at 90 in the drawings, the survey aircraft is preferably flown along a second flight course or ground track 91 and 92 and across at least two common "control points" while rephotographing the area previously photographed at these "control points." At the intersections of the ground tracks another series of overlapping photographs 91a and 92a are made, simultaneously photographing the sun, with the reflector 20 adjusted in azimuth and in elevation relative to an assumed horizontal position for the geographical positions of the aircraft and orientation of the aerial survey camera E. Recording the time, and "ground track" direction of the photographs taken on this latter flight, like the sun camera pictures in the flight 83 and 84 will indicate, by the displacement of the position of the center of the sun's image on the grid plate surface 64, recorded by the camera 76, the degree of tilt of the focal plane of the survey camera E toward or away from the sun. Since the sun's position in azimuth changed approximately 90 degrees from its position when the flight 91, 92 was made, the photographs of the same area made at the different times record the degree of tilt in two planes which are substantially transverse to each other. The position of the sun's image is diagrammatically indicated at 90 for the second flight 91—92. Fig. 10 represents two overlapping or sterophotographs which include the same area, the areas being indicated at 91a and 83a where the flight courses 91 and 83 intersect. Fig. 10A represents a photograph made with the sun camera simultaneously with the photograph represented at 94 in Fig. 10, illustrating the sun's image 93 displaced from the center of the grid plate in a direction toward the sun, indicating that the focal plane of the survey camera E was tilted downwardly toward the sun to a predetermined angle as indicated by the displaced position of the sun's image 93 on the surface of the grid plate 46 at the time the comparison survey exposure was made. Fig. 10B diagrammatically illustrates a photograph taken simultaneously with the photograph 94A, similar to the photograph 91ª and where the "ground tracks" 91 and 83 intersect, the position of the sun's image 93 diagrammatically illustrating in photograph Fig. 10B, that the focal plane of the survey camera E was again tilted downwardly toward the sun by some definite angle as determined by the displacement of the center of the sun's image from the center of the grid plate surface 64. Since the sun's position as depicted respectively in Figs. 10A and 10B was changed 90 degrees in azimuth, the sun's displacements from the center of the grid plate in the two exposures represent transverse tilts of the survey camera focal plane relation to a true horizontal position thereof. In order to determine the nadir points in the aerial survey photographs they are preferably projected and matched steroscopically. A diapositive of the photograph as depicted at 94 is placed in an adjustable projector 95 (Fig. 11), while a diapositive of the photograph as depicted at 94A is projected from a second adjustable projector 96. The plane of tilt from the horizontal, of the photograph or diapositive 94 is set into the projector 95 to correspond with the degree of tilt indicated by the displacement of the sun's image in the companion sun camera picture and the diapositive image is projected onto a level base or screen 97, or onto a vertically adjustable horizontal screen or table 98. The projector 96 is also adjusted and tilted so that the plane of the second photograph relative to the base 97 corresponds to the degree of tilt (relative to the horizontal) as indicated by the displacement of the sun's image on the grid plate surface 64 as shown in the companion sun camera picture depicted in Fig. 10B. Then by raising or lowering the projectors and moving them transversely relative to each other and by relative tipping the projectors in the planes of tilt not indicated by the sun's image displacement in the simultaneously made sun image pictures, the overlapping portions of the two projected images can be steroscopically matched. The vertical adjustment of the table or stage 98 being used for matching points shown in the photographs having substantially the same heights or elevations of objects in the actual terrain photographed. Where the two photographs are steroscopically matched, the planes of the two diapositives in the projectors will be parallel to the focal plane of the survey camera when each of the photographs of the terrain in the diapositives was made. The distance indicating counters 66 and 67 indicate a very close geographical position of the survey or mapping aircraft relative to the control stations 85 and 86, when each of the survey photographs was made, and therefore a perpendicular dropped from the rear node of each of the projectors 95 and 96 will indicate or pass through the nadir point in the projected image on the table surface 97, or on the surface of the vertically adjustable stage 98. From the nadir point as determined in each of the projected photographs the geographical location of any prominent points or objects can be easily scaled off from the nadir point, measured and determined with precision.

In the foregoing description it was contemplated that two overlapping photographs be made of the same area, each simultaneously with a photograph of the position of the sun's image, made with a sun image having a sun image reflecting surface, or photographic axis adjusted in azimuth and in elevation to extend directly toward the position of the sun in the heavens, one pair of the terrain and sun image photographs being made when the sun is in one position in the sky, and the second overlapping or "tie in" photograph of the surveyed area and that of the sun's image being made later, when the sun's position has changed in azimuth approximately 90 degrees, and since the geographical position of the camera when each photograph was made is known or determined, and the degree of tilt of the focal plane of the aerial survey camera toward or away from the sun is determined by the degree of angular displacement of the photographic image of the sun relative to a predetermined or assumed control position thereof indicated on the grid plate surface such as the rotational center of the grid plate where the focal plane of the survey camera would have been level when the sun image is coincident therewith, the position of the sun's image in each of the companion sun camera photographs indicates the degree of tilt of the survey camera focal plane in a plane which is transverse to the tilt recorded by the displacement of the sun's image in the other sun image picture.

It is well known that sun spots are visible on the sun substantially at all times and that the positions of these sun spots on the surface of the sun change very slowly. I propose to utilize the relative position of these sun spots, in a modified carrying out of my improved focal plane level determining system, as a means for accurately determining the tilt of the focal plane of the survey camera E without the necessity of making the second or "tie in" sun image photograph over the same control area. In carrying out this modified method or system, I first made a preliminary or reference photograph of the sun's image, accurately focused on the grid plate through the sun camera lens 18, the lens 18 having sufficient focal length and accuracy to clearly project the position and outlines of the sun spots on the sun's image as diagrammatically illustrated at 93ª and 100. When this picture of the sun is made for orientation reference purposes the reflector 20 is preferably adjusted in azimuth and in elevation with the survey aircraft on the ground so as to dispose the reflected sun's image 93ª (Fig. 12) at the center of the grid surface 64 and the sun spot images 100 in a reference relation to lines on the grid surface 64 while the focal plane of the survey camera is precisely level or horizontal. A similar orientation reference picture of the sun's image 93ª, and sun spot images 100 is made, preferably on the ground with the survey camera focal plane level, after the aerial survey is completed, and the time differential between these two sun pictures is recorded so that any movement or change in the position of the sun spot 100 can be noted or averaged.

The aerial or mapping survey is now made as in the former method, the aircraft being flown along a conventional air survey course or ground track such as shown at 83 and 84 in Fig. 9, pictures of the terrain below and of the sun including the sun spots 100 being simultaneously exposed with the survey camera E and the sun image position recording camera 76, the reflector 20 being preferably adjusted in azimuth and in elevation, from time to time to reflect the sun's image 93 to the center of the grid plate surface 64 with the sun spots 100 in their proper oriented positions only when and if the survey camera focal plane is precisely level. With each of the successive overlapping survey photographs 94 a companion photograph, similar to the photograph as depicted diagrammatically in Fig. 10A is made recording the position of the sun image 93 on the grid surface 64, and also the relative positions of the images of the "sun spots" on the grid pattern, and the other data as indicated by the instruments and indicia associated with and surrounding the grid plate 46. Altitude, time, geographical location, number of exposure, flight data, the adjusted position of the reflector in azimuth and in elevation relative to the predetermined or horizontal position of the survey camera focal plane and the orientation of the survey camera are recorded in the photographic exposure made with the camera 76 in addition to the sun's image. After the photographs are developed and preferably enlarged the position of the center of the sun's image 93 on the grid pattern 64 in the plane passing through the arrow 65 and the center of the grid plate, relative to the center of the grid plate, determines the degree of tilt of the survey camera focal plane toward or away from the sun's position in the heavens at the time the picture was made. The position of the arrow 65 relative to the scale 63 denotes the position of the sun relative to the orientation of the survey camera photographs, while the rotative displacement of the sun spots about the center of the sun's image as recorded in the photographs relative to the position of the sun spots in the preliminary orientation photographs denote the tip (transverse tilt) of the survey camera focal plane or the rotational displacement of the survey camera about an axis extending directly toward the sun. Corresponding elevation or depression of the plane of the diapositives made with the survey camera from a horizontal position will dispose the planes of the diapositives in parallel relation to the survey camera focal plane when the survey photographs were made while transverse tilting or tipping of the diapositive from a horizontal or level position in predetermined ratio to the relative rotational displacement of the sun spots from their positions in the reference photographs, as set forth above, determines the degree of transverse tilt of the survey camera focal plane when the photographic exposure was made.

If the survey photograph is a transparency or diapositive projected onto a horizontal surface while in the aforesaid oriented (originally tilted) position, a vertical line from the center of the projection lens will pass through the nadir point in the projected terrain photograph. Since the geographical position of the survey aircraft (camera) is known, or determined by the Shoran indicators 66 and 67 recorded in the companion photograph made by the sun camera 76, the geographical position of the nadir point in the survey photograph is also determined and precise geographical locations of other more prominent control points in the survey photographs are easily determined from the nadir point by scaling or measuring the relative distance between the nadir and control points in the usual manner. The above method or system for determining the degree of tilt and tip in aerial survey photographs, by utilizing the relative position of the sun in the heavens to denote the degree of tilt in one plane and the relative position of the sun spots on the sun's surface to determine the degree of tip (tilt in a transverse plane) as recorded by sun spot position in each companion photograph, rather than determining the tilt in transverse planes by first determining the tilt of the focal plane in one photograph by the position of the sun's image in a companion photograph when the sun is in one position in the heavens and then determining the degree of transverse tilt in a second photograph which includes a part of the terrain area recorded in the first photograph, by the relative position of the sun's image in a second companion photograph simultaneously made when the sun's position has changed in azimuth about 90 degrees, is thought to be a modified embodiment of my improved method for determining tilt and tip in aerial survey photographs and determining the geographical position of the nadir point and other prominent control points in the photograph.

The azimuth direction of the survey camera focal plane, or the azimuth position of the fiducial reference marks on the photographs taken with the survey camera can be determined by the position of the sun image and the sun spots thereon in the simultaneously exposed sun camera photographs, since a predetermined change in azimuth of the position of the sun and survey cameras will also cause a predetermined change in the relative and reference positions of the sun spots on the sun's image when photographed by the sun camera.

The details of the apparatus disclosed in the drawings is for exemplary purposes, it being obvious that changes may be made therein without departing from the spirit of the invention as defined by the following claims.

I claim as my invention:

1. In aerial survey photographic apparatus for simultaneously photographing an area to be surveyed below a survey aircraft and a selected celestial body such as the sun to determine the nadir point in the survey photographs, an aerial survey camera, means for mounting the survey camera on a photographic survey aircraft with its photographic axis extending downwardly substantially perpendicular to the normal flight axis of the survey aircraft and having a focal plane perpendicular to said photographic axis, a sun camera fixedly associated with the aerial survey camera, said sun camera having a lens axis parallel to the survey camera photographic axis a sun image reflecting means adjustable in azimuth and in elevation relative to the position and orientation of the said aerial survey camera focal plane and the sun camera lens axis, calibrated reference means in the sun camera focal plane for indicating the adjusted position of the sun camera reflecting means and the degree of relative angular displacement of the sun's image thereon from the adjusted position of the sun camera reflecting means in the direction toward the sun, including indicating means located in the focal plane of the sun camera to be photographed simultaneously with the image of the celestial body for determining the altitude of the aerial survey camera and the adjustment in azimuth and in elevation of the reflecting means of the sun camera relative to an assumed horizontal position of the survey camera focal plane at the geographical position where and when the simultaneous photographic exposures of the surveyed area and the celestial body are made, means operable between said survey and sun cameras for making simultaneous exposures therewith, and geographical location determining means positioned in said sun camera focal plane to be photographed with the sun's image, for determining the location of the survey camera above the surveyed area when the area and the celestial body are simultaneously photographed.

2. In an aerial photographic survey apparatus, an aerial survey camera having a lens axis and a focal plane perpendicular to said axis, a sun camera having a relatively long focus lens with a focal plane perpendicular to the lens axis of the sun camera, rigid mounting means between the aerial survey and sun cameras, mounting the said cameras with their respective focal planes parallel to each other and their lens axes extending in diametrically opposite substantially vertical directions, actuating means between the said cameras for making simultaneous photographic exposures therewith, adjustable sun image reflector means, means mounting the reflector means in the sun camera lens field for rotative displacement in azimuth concentrically relative the sun camera lens axis, and for tilt adjustment in radial planes extending from the sun camera lens axis, calibrated adjusting means between the sun camera and the reflector mounting means for adjusting the reflector means in azimuth, calibrated adjusting means operable between the reflector means and the reflector mounting means for adjusting the reflector means in said radial planes passing through the sun camera lens axis, indicating means in the sun camera focal plane to be photographed with the sun's image for recording a predetermined zero reference position of the sun's image in the sun camera focal plane where the survey camera focal plane would be horizontal and the sun's image would be located and photographed coincident with the zero reference position to thereby record the relative displacement of the sun's image from said zero position when said sun camera axis is tilted and recording the direction of said tilt.

3. In an aerial survey photographic apparatus, and means for determining the degree of "X" and "Y" tilt in an aerial survey photograph, an aerial survey camera adapted to be carried by an aircraft over a terrain to be photographed, having a substantially vertical photographic axis and a focal plane normal thereto, a sun camera fixedly associated with said aerial survey camera having a focal plane parallel to the survey camera focal plane and a photographic axis extending normal thereto in 180 degree fixed relation to the survey camera photographic axis, optical reflecting means adjustably carried on the sun camera in the sun camera lens field, for reflecting the image of a selected celestial body such as the sun into collimation with the center of the said lens field and with a zero indication at the center of the lens field on the sun camera focal plane for recording and determining the sun camera len's axis, means for adjusting the reflecting means in azimuth and in elevation relative to the plane and orientation of the survey and sun camera focal planes when the terrain and the sun are simultaneously photographed at determined geographical control points at determined time periods when the survey camera photographic axis is assumed to be vertical with the reflected angle of the reflecting means of the sun camera extending directly toward the position of the sun in the heavens, whereby the degree of tilt of the aerial survey camera toward the sun is determined by the relative degree of angular displacement between the photographed position of the sun's image on the sun camera focal plane and the position of the sun camera zero indication on its focal plane when and where said terrain and the sun are simultaneously photographed with the survey and sun camera focal planes in assumed level positions, when the sun's position in azimuth in each of the two control points is angularly disposed approximately 90 degrees in azimuth.

4. In aerial photographic apparatus, a support, means for rigidly mounting the support in an aircraft for rotation adjustment about a substantially vertical axis, an aerial survey camera, means for mounting the survey camera in the aircraft rigidly relative to the support, with its photographic axis substantially vertical to the normal flight attitude of the aircraft, a sun camera having a focal plane perpendicular to the photographic axis of the aerial survey camera and a substantially long focus lens system mounted on the support with its axis perpendicular to the sun camera focal plane and extending through the central portion of the focal plane and focused on the focal plane at infinity, said focal plane having a central reference point thereon for indicating the photographic axis of the sun camera, coordinate and concentric reference on the focal plane surrounding the reference point for indicating the direction and degree of angular displacement of the sun's image on the focal plane from the sun camera photographic axis when the sun camera is focused on a celestial body, such as the sun, adjustable reflecting means carried by the support in front of the sun camera lens and adjustable in azimuth and in elevation to reflect the image of the celestial body along the central axis of the sun camera lens field coincident with said axis, calibrated adjusting means between the support and the reflecting means for setting the reflecting means to reflect the image of the celestial body into coincidence relation with the axis of the sun camera lens from the known or calculated position of the celestial body in the heavens, relative to position, altitude and direction of flight of the aircraft on which the apparatus is mounted, to dispose the image of the celestial body on the focal plane at the central reference point only when the photographic axis of the aerial survey camera is vertical, whereby displacement of the said image relative to the central point and into registration with the coordinate and concentric reference indicia when the aerial survey camera is not vertical indicates the direction and degree of tilt thereof, said sun camera including a second camera focused on said sun camera focal plane, and means for simultaneously making photographic exposures with the second camera and with the aerial survey camera, to photograph the sun camera focal plane at each instant the terrain below is photographed with the aerial survey camera.

5. Apparatus as claimed in claim 4, including geographical position indicating means adjacent the aforesaid coordinate and concentric reference means for indicating the geographical position of the aircraft, so as to be photographed by the second camera with the reference means.

6. In aerial survey apparatus an aerial survey camera, mounting means for mounting the camera in an aircraft with its photographic axis substantially vertical to normal flight, and its focal plane perpendicular to the photographic axes, a sun camera rigidly fixed relative to the survey camera having an image screen at the focal plane parallel to the survey camera focal plane, a lens rigidly mounted above the screen and focused thereon with its photographic axes perpendicular to the screen at the approximate center thereof, angle measuring indicia on the screen surrounding the center of the screen for determining the degree and direction of displacement of the center of an image of the sun focused on the screen through the sun camera lens from the center of the screen, an adjustable light reflecting device mounted rigidly in front of the sun camera lens, adjustable in azimuth and tiltable in elevation relative to the photographic axis of the sun camera lens, calibrated adjusting means for adjusting the reflecting device in azimuth and in elevation to reflect the image of the sun from a known or calculated position in the heavens into collimation with the photographic axis of the sun camera lens at the known geographical position of the observer at a predetermined time, when the focal plane of the survey camera is horizontal in at least one tilt plane, whereby the relative angular displacement of the image of the selected celestial body from the said photographic axis of the sun camera lens denote the degree of tilt of the focal plane of the aerial survey camera in said tilt plane, a camera adjacent to, and focused on the screen for photographing the screen and the displacement of the image of the celestial body on said screen relative to the photographic axis of the sun camera lens, and means connected between the aerial survey camera and the tilt recording camera for actuating the tilt recording camera to photograph the screen each time the survey camera is actuated to photograph the terrain therebelow.

7. The method of determining the degree of tip and tilt in aerial survey photographs in transverse intersecting directions which comprises photographing a similar portion of an area to be surveyed in two transverse intersecting directions at two different times of the day when the sun is shining and the sun's position in the heavens has changed substantially 90° in azimuth, simultaneously determining and recording the approximate geographical position and G. C. time when and where each of the photographic exposures were made while simultaneously photographing a reflected image of the sun with the said photographed portion of said area at said geographical positions and photographing simultaneously with the sun's image a predetermined reference position of the reflected sun's image relative to the plane of the survey photograph when the same was not tilted in the direction toward the sun, and measuring the degree of angular displacement of the photographed image of the sun from said predetermined reference position of the sun in each of the sun image photographs exposed at the two approximate similar geographical positions at said different times of the day to determine the degree of tilt therein in the direction toward the sun at the time the photographs were made.

8. The method of determining the degree of tip and tilt in aerial survey photographs which comprises photographing an area to be surveyed in transverse intersecting directions at different times of the day at similar geographical positions when the sun is shining and its position in the heavens has changed substantially 90° in azimuth, and simultaneously determining and recording the geographical position, altitude and G. C. time when and where each of said photographic exposures is made, and simultaneously photographing a reflected image of the sun with the area and a predetermined reference position of the sun's image relative to the plane of the survey photograph where the aerial survey photograph plane would be horizontal in the direction toward the sun at said similar geographical positions when the position of the sun has changed approximately 90° in azimuth, to determine the position of the image of the sun relative to a predetermined reference position of the sun's image to the plane of the survey photograph when the survey photograph plane is not tilted in the direction toward the sun, and matching the aerial survey photographs exposed at said approximate geographical positions at said different times when the sun's azimuth position has changed, to determine the relative degree of tip and tilt between the respective planes of the survey photographs toward the sun at the times of exposure, by adjusting the position of the planes of the matched photographs relative to a predetermined horizontal reference plane, while maintaining the aforesaid matched relation therebetween in the transverse tilt planes as determined by the aforesaid degree and direction of displacement of the sun's image in the simultaneously exposed sun photographs relative to the said predetermined reference position of the sun's image when the survey photographic plane would be horizontal toward the sun, to dispose the planes of the respective matched photographs in parallel relation to the tilt planes that they occupied when the same were exposed, and locating a perpendicular reference axis extending through the matched photographs at a point coincident with the center of the lens of the camera which made the photographic exposures of the area to dispose said perpendicular reference axis through the nadir point in each photograph by utilizing the degree of angular displacement of the photographed image of the sun from said predetermined reference position in each of the sun image photographs that were exposed at the said approximate geographical positions at said different times when the sun's position had changed approximately 90° in azimuth, to determine the degree of tip and tilt toward the sun of the focal planes of the respective photographs of the area to dispose the tip and tilt in the survey camera photographs in two transverse intersecting directions.

9. The method of determining the degree of tilt in transverse intersecting directions in aerial survey photographs which comprises photographing an area to be surveyed in transverse intersecting directions at different times of the day when the sun is shining and its position in the heavens has changed substantially 90° in azimuth, by simultaneously recording and determining the approximate geographical position, altitude and G. C. time when and where each of said photographic exposures is made, and simultaneously photographing the sun with the area at said similar geographical positions and photographing a predetermined reference position of the sun where the survey photograph would be horizontal, to record the image of the sun relative to a predetermined reference position of the sun to the focal plane of the survey photograph when the latter is not tilted in the direction toward the sun, matching the aerial photographs exposed at said approximate geographical positions at said different times when the sun's azimuth position has changed 90° and determining the relative degree of tilt of the respective focal planes of the survey photographs toward the sun at the times of exposure by measuring the degree of angular displacement of the photographed image of the sun from said predetermined reference position in each of the sun image photographs that were exposed at said approximate geographical position at said different times when the sun's position had changed approximately 90° in azimuth, to adjust the degree of tilt toward the sun in the focal planes of each of the respective simultaneously exposed photographs of the area, equal to the tilt of the survey photographs transverse planes at the time they were made.

10. The method of determining "X" and "Y" tilt in aerial survey photographs which comprises making a series of successive photographic exposures from a series of geographically determined positions above the area to be photographed, at a substantially constant altitude, to obtain a series of successive photographic exposures across the area along a predetermined ground track, and simultaneously photographing the position of a selected celestial body in the heavens such as the sun, while maintaining a fixed oriented position between the focal planes of the sun and area photographs at each of at least two well separated control points above the area in the series of photographs at least at two different times of the day when the position of the sun has changed approximately 90° in azimuth to photograph the position of the selected celestial body on the sun image photograph relative to a reference position of the body on the photograph where the survey photograph focal plane would be horizontal at the time the simultaneous exposures are made, determining and recording the geographical position at the time of said simultaneous exposures, measuring the degree of angular displacement of the photographic image of the celestial body on the sun photograph, in the direction toward the body, from the reference position to determine the degree of tilt of the survey photograph focal plane in the "X" plane of tilt, measuring the degree of angular displacement of the celestial bodies image from the reference position in the direction toward the body at the said approximate same control point at the said different time of the day to determine the "Y" plane of tilt of the survey photograph focal plane at said control point.

11. The method of determining the degree of transverse tip and tilt in aerial survey photographs which comprises making successive photographic exposures oriented in a predetermined direction, of a terrain area to be surveyed from progressively advancing geographically determined positions above the area at determined times and altitude to obtain a photographic record of the terrain area, simultaneously photographing the reflected image of the sun and photographing the terrain below relative to a predetermined reference position where the sun's image would coincide if the survey photograph plane would be horizontal toward the sun, at two spaced geographical control points above the terrain being photographed, at each of two materially different determined time periods and geographical locations when the position of the sun at each of the determined control points has changed approximately 90° in azimuth, and determining the degree of transverse tip and tilt toward the sun in the aerial survey photographs at each of said determined geographical control points by the degree of angular displacement of the photographed position of the sun's image in the direction toward the sun relative to the reference position of the sun on the photographs when the plane of the survey photographs would have been horizontal.

12. The method of determining the degree of tip and tilt in aerial survey photographs which comprises leveling the focal plane of an aerial survey camera that is to make the survey photographs, recording the position of the image of the sun in the heavens on a predetermined oriented focal plane just before making the aerial survey in which the focal plane is fixed relative to the aerial survey photograph plane to dispose the image of the sun in a predetermined reference position and to simultaneously record the relative reference position of sun spots on the sun's image when the aerial survey camera focal plane is precisely horizontal to provide a sun image reference photograph, making the survey photographs at determined geographical positions along a survey ground track at determined and recorded times of the day, closely following said first recorded position of the sun's image and sun spots and determining the degree of tilt in the aerial survey camera focal plane toward or away from the position of the sun in the heavens simultaneously while taking the aerial survey photographs by determining and recording the degree and amount of displacement of the sun's image on the sun camera focal plane from the aforesaid reference position of the sun's image thereon to determine tilt in one direction, and determining the transverse tilt in the aerial survey camera focal plane by the degree of rotative displacement of the sun spots on the sun's image recorded at that time on the sun camera focal plane, relative to the aforesaid previously recorded reference position of the sun spots thereon.

13. The method of determining the degree of tip and tilt and displacement in azimuth in aerial survey photographs made with an aerial survey camera which comprises the leveling the focal plane of the aerial survey camera to a horizontal position, photographing the position of the sun in the heavens from a known geographical point just before making the aerial survey, utilizing a sun camera having a focal plane fixed and oriented relative to the aerial survey camera focal plane to dispose the image of the sun in a predetermined reference position on the survey camera focal plane and to record with the reference position of the sun's image the relative reference position of sun spots on the sun's image while the aerial survey camera focal plane is precisely horizontal and in a predetermined azimuth orientation, making a series of aerial survey photographs at determined geographical positions with the aerial survey camera and simultaneously making at least two photographs of the sun at a different time of the day immediately following the first reference photograph of the sun and sun spots to obtain a reference photographic image of the sun and sun spots, and determining the degree of tilt in the aerial survey camera focal plane toward or away from the position of the sun in the heavens in the survey photographs by the degree of the displacement of the reference position of the sun's image on the sun camera photographs from the aforesaid recorded position of the sun's image while the survey camera photographs are made, and determining the transverse azimuth displacement in the aerial survey camera photographs by the degree of rotative displacement of the recorded images of the sun spots on the sun's image on the sun camera focal plane while the survey photographs are made, relative to the predetermined recorded position of the sun spots on the recorded sun's image photographs made at the same time.

LEO N. BRUBAKER.

References Cited in the file of this patent

UNITED STATES PATENTS

| Number | Name | Date |
|---|---|---|
| 1,880,960 | Keale, Jr. | Oct. 4, 1932 |
| 2,047,070 | Horner | July 7, 1936 |
| 2,273,876 | Lutz et al. | Feb. 24, 1942 |

FOREIGN PATENTS

| Number | Country | Date |
|---|---|---|
| 439,227 | Germany | Jan. 12, 1927 |

OTHER REFERENCES

Santoni, A. P. C. Publication No. 256,012, May 4, 1943. Now abandoned.